US012785421B2

(12) United States Patent
Jiang et al.

(10) Patent No.: US 12,785,421 B2
(45) **Date of Patent: *Nov. 3, 2026**

(54) BATTERY PACK MANAGEMENT SYSTEM, METHOD THEREOF AND POWER TOOL SYSTEM

(71) Applicant: Greenworks (Jiangsu) Co., Ltd, Changzhou (CN)

(72) Inventors: Yonghe Jiang, Changzhou (CN); Biao Li, Changzhou (CN); Xian Zhuang, Changzhou (CN); Zhiyuan Li, Changzhou (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,180

(22) Filed: Jun. 26, 2024

(65) Prior Publication Data

US 2024/0348062 A1 Oct. 17, 2024

Related U.S. Application Data

(63) Continuation of application No. 17/482,453, filed on Sep. 23, 2021, now Pat. No. 12,046,929.

(30) Foreign Application Priority Data

Sep. 24, 2020 (CN) ........................ 202011014644.8

(51) Int. Cl.
*H02H 1/00* (2006.01)
*H02H 7/20* (2006.01)
(Continued)

(52) U.S. Cl.
CPC ................ *H02J 7/50* (2026.01); *H02J 7/575* (2026.01); *H02J 7/62* (2026.01); *H02J 7/64* (2026.01); *H02J 7/731* (2026.01)

(58) Field of Classification Search
CPC ...... H02J 7/50; H02J 7/575; H02J 7/62; H02J 7/64; H02J 7/731; H02J 7/663; H02J 1/084; H02J 7/34; H02J 7/855
See application file for complete search history.

(56) References Cited

U.S. PATENT DOCUMENTS

2006/0049816 A1* 3/2006 Tan ....................... H02M 7/003 323/297
2011/0056177 A1 3/2011 Goto
(Continued)

FOREIGN PATENT DOCUMENTS

CN 101636847 A 1/2010
CN 102122826 A 7/2011
(Continued)

*Primary Examiner* — Elim Ortiz

(57) ABSTRACT

The disclosure provides a battery pack management system, which includes a plurality of battery packs for supplying a power to a load, a plurality of battery interfaces, a plurality of switching units, a control assembly and a plurality of communication units. Each of the battery packs is electrically connected in parallel by the battery interfaces. The switching units are electrically connected to the battery interfaces and the battery packs through the battery interfaces are electrically connected to the switching units. The control assembly detects a voltage level of each battery pack and determines the battery packs having a first highest priority level through the voltage level detected. The communication unit is electrically connected to the battery packs and the load, and the switching units is closed by the control assembly through the information for supplying the power to the load by the battery packs having the highest priority level.

25 Claims, 12 Drawing Sheets

(51) Int. Cl.

| | |
|---|---|
| ***H02J 7/00*** | (2026.01) |
| ***H02J 7/50*** | (2026.01) |
| ***H02J 7/62*** | (2026.01) |
| ***H02J 7/64*** | (2026.01) |
| *H02J 7/70* | (2026.01) |

(56) References Cited

U.S. PATENT DOCUMENTS

| | | | | |
|---|---|---|---|---|
| 2013/0181681 | A1* | 7/2013 | Mukai | H02J 7/663<br>320/128 |
| 2014/0265604 | A1 | 9/2014 | Mergener | |
| 2016/0183451 | A1 | 6/2016 | Conrad et al. | |
| 2019/0097453 | A1* | 3/2019 | Saito | H02J 7/1423 |

FOREIGN PATENT DOCUMENTS

| | | | |
|---|---|---|---|
| CN | 102158129 | A | 8/2011 |
| CN | 102611133 | A | 7/2012 |
| CN | 103715983 | A | 4/2014 |
| CN | 204068287 | U | 12/2014 |
| CN | 205039765 | U | 2/2016 |
| CN | 106549416 | A | 3/2017 |
| CN | 106941261 | A | 7/2017 |
| CN | 108173280 | A | 6/2018 |
| CN | 111525519 | A | 8/2020 |
| CN | 111555393 | A | 8/2020 |
| JP | 2012205078 | A | 10/2012 |
| JP | 2019046638 | A | 3/2019 |
| WO | 2018031719 | A1 | 2/2018 |
| WO | 2020025024 | A1 | 2/2020 |

* cited by examiner

BATTERY PACK MANAGEMENT SYSTEM, METHOD THEREOF AND POWER TOOL SYSTEM

CROSS REFERENCE TO RELATED APPLICATION

The present application is a continuation Application of U.S. patent application Ser. No. 17/482,453 filed on Sep. 23, 2021, which claims the benefit of CN202011014644.8 filed on Sep. 24, 2020. All the above are hereby incorporated by reference for all purposes.

TECHNICAL FIELD

The disclosure belongs to the field of power tools, and particularly relates to a bus module, a cascade module and a bus module control method for connecting a battery pack in parallel.

BACKGROUND

The power tool can reduce the labor intensity of workers and improve the working efficiency of workers, and can be widely applied to the fields of construction, decoration, garden, household cleaning and the like. For the use range of the power tool not to be limited by mains supply, the power tool is typically configured with a battery pack to facilitate the use of the power tool where there is no mains plug. The conventional power tools use a single battery pack to supply power for the power tools, thereby the output power of the power tool is limited. To improve the output power of the power tool by increasing the output voltage of the battery pack, not only the requirements of the power tool on the material selecting specification and the pressure resistance are improved, but also the technical difficulty and technical risk of product development are greatly increased.

BRIEF DESCRIPTION OF THE DISCLOSURE

In view of the above deficiencies, the disclosure provides a bus module, a cascade module, and a bus module control method to facilitate users or manufacturers to quickly connect several battery packs in parallel with each other to supply power for the power tool, thereby the output power of the power tool is increased.

The disclosure provides a bus module which includes an input unit, an output unit, a switching unit, and a control unit. The input unit includes at least one input branch which includes an input interface electrically connected to a peripheral power supply to obtain power output by the peripheral power source. The output unit is provided with an output branch, and the output branch is provided with an output interface to output power obtained by the input unit. One end of the switching unit is connected to the input unit, and the other end of the switching unit is connected to the output unit. And the control unit controls the switching unit to work to control an on-off state between the input branch and the output branch.

The disclosure also provides a cascade module which includes a first bus module and a second bus module, wherein the first bus module or the second bus module includes an input unit, an output unit, a switching unit, and a control unit. The input unit includes at least one input branch which includes an input interface electrically connected to a peripheral power supply to obtain power output by the peripheral power source. The output unit is provided with an output branch, and the output branch is provided with an output interface to output power obtained by the input unit. One end of the switching unit is connected to the input unit, and the other end of the switching unit is connected to the output unit. And the control unit controls the switching unit to work to control an on-off state between the input branch and the output branch. Wherein the output interface of the first bus module is electrically connected to the input interface of the second bus module.

The disclosure also provides a cascade module which includes a first bus module and a second bus module, wherein the first bus module or the second bus module includes an input unit, an output unit, a switching unit, and a control unit. The input unit includes at least one input branch which includes an input interface electrically connected to a peripheral power supply to obtain power output by the peripheral power source. The output unit is provided with an output branch, and the output branch is provided with an output interface to output power obtained by the input unit. One end of the switching unit is connected to the input unit, and the other end of the switching unit is connected to the output unit. And the control unit controls the switching unit to work to control an on-off state between the input branch and the output branch. Wherein the output branch of the first bus module is electrically connected to the output branch of the second bus module.

The disclosure further provides a bus module control method which includes: S1, detecting the current of each input branch or the voltage of a peripheral power supply corresponding to the input branch, and disconnecting the input branch and the output branch if the current or the voltage is abnormal; S2, controlling remaining input branches to be electrically connected to the output branches.

In summary, the disclosure provides a bus module, a cascade module and a bus module control method to facilitate users or manufacturers to quickly connect several battery packs in parallel with each other to supply power for the power tool, thereby the output power of the power tool is increased. The battery packs are controlled to participate in power supply in sequence according to the voltage of the battery pack, and the battery packs of the same voltage are connected in parallel to supply power. Such that the problem of discharging the low-voltage battery pack by the high-voltage battery pack is effectively solved, and the service life of the battery pack is prolonged.

BRIEF DESCRIPTION OF THE DRAWINGS

To illustrate the technical solutions of the embodiments of the disclosure clearer, the drawings needed in the embodiments will be describe in simple bellow. The drawings bellow are merely related to certain embodiments of the disclosure, those skilled in the field can obtain some other drawings according to the drawings bellow without creative efforts.

DETAILED DESCRIPTION

Specific embodiments of the disclosure will be described below, those skilled in the field can easily understand the advantages and effects of the disclosure according to the description of the embodiments. The present disclosure may also be embodied or applied in other different specific embodiments. The details of the description can also be based on different viewpoints and applications. And various modifications or changes may be made without departing from the spirit of the disclosure.

It should be noted that the illustrations provided in the embodiments of the disclosure are merely in a schematic way to illustrate the basic idea of the disclosure. Therefore, the drawings only show assemblies related to the disclosure, rather than showing the number, shape, and size of the assemblies in actual implementation. And the types, quantities and proportions of the assemblies in actual implementation may be changed in any way. The layouts and patterns of the assemblies may also be more complex.

The disclosure provides a bus module, a cascade module and a bus module control method to facilitate users or manufacturers to quickly connect several battery packs in parallel with each other to supply power for the power tool, thereby the output power of the power tool is increased. The battery packs are controlled to participate in power supply in sequence according to the voltage of the battery pack from high to low, and the battery packs of the same voltage are connected in parallel to supply power. Such that the problem of discharging the low-voltage battery pack by the high-voltage battery pack is effectively solved, and the service life of the battery pack is prolonged.

Figure 1:
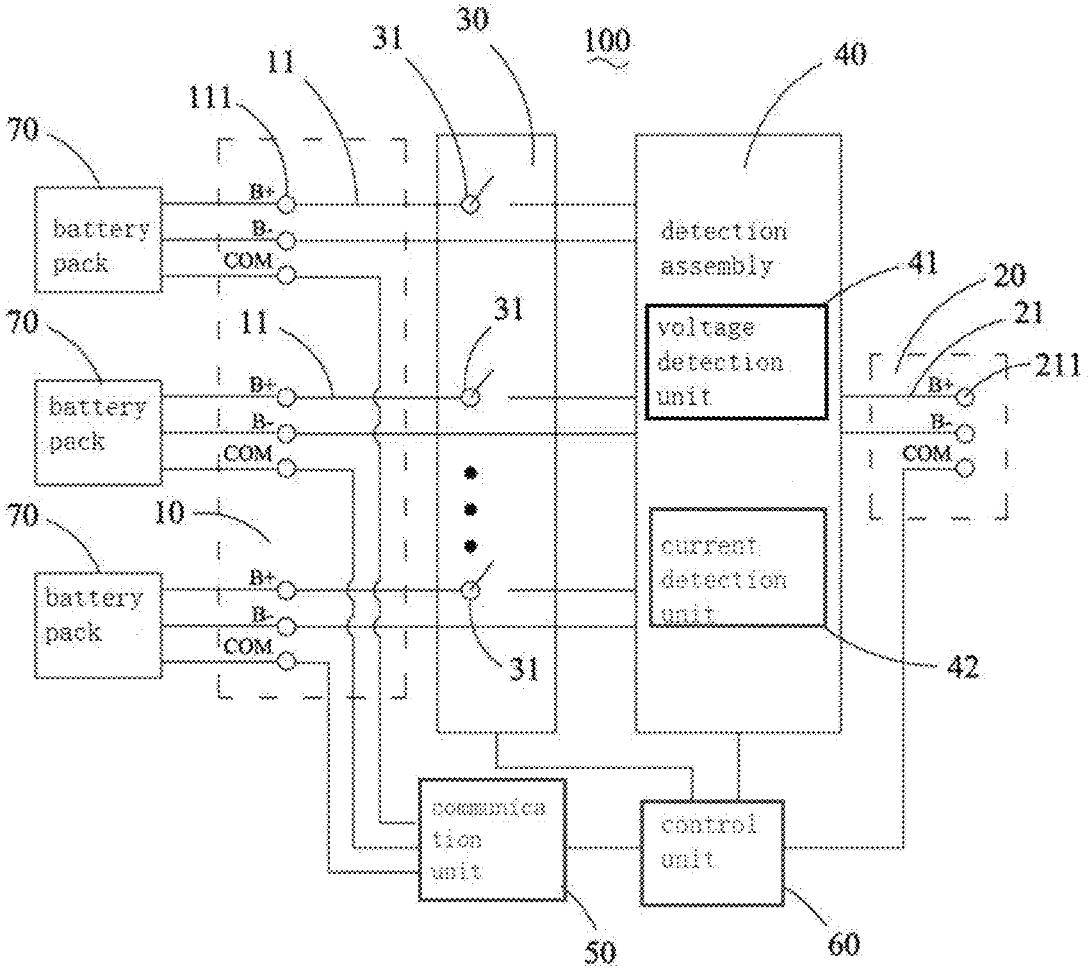
FIG. 1 is a schematic structural diagram of a bus module of the disclosure.

Referring to FIG. 1, one embodiment of the disclosure provides a bus module 100 which includes an input unit 10, an output unit 20, a switching unit 30, a detection assembly 40, a communication unit 50, and a control unit 60. The input unit 10 is electrically connected to the peripheral power supply 70 to obtain the power of the peripheral power source 70. The input unit 10 includes at least one input branch 11. The input branch 11 is provided with an input interface 111 that interfaces with the peripheral power supply 70. The peripheral power supply 70 may be a battery pack, or another bus module plugged with a battery pack. The output unit 20 may output power obtained by the input unit 10. The output unit 20 is provided with an output branch 21 which is provided with an output interface 211 for interfacing with a peripheral tool. The peripheral tool may be a power tool such as an electric drill, an electric saw, a dust collector, or a mower. The peripheral tool may also be another bus module electrically connected to the power tool. One end of the switching unit 30 is connected to the input unit 10, and the other end of the switching unit 30 is connected to the output unit 20. Such that the on-off between the input branch 11 and the output branch 21 is controlled. The switching unit 30 includes a switch 31 corresponding to the input branch 11. One end of the switch 31 is connected with the input branch 11, and the other end of the switch 31 is connected with the output branch 21. Such that the on-off between the input branch 11 and the output branch 21 is controlled. The switch 31 may be an electromagnetic relay, a MOSFET, an IGBT, or the like. The bus module 100 may quickly connect a plurality of battery packs in parallel with each other to supply power for the power tool to increase the output power of the power tool and prolong the working time of the power tool. The number of input branches 11 of the bus module 100 may be configured as two or three. Or multiple input branches 11 may be connected in parallel according to the needs of the user.

Referring to FIG. 1, in one embodiment of the disclosure, the detection assembly 40 includes a voltage detection unit 41 and a current detection unit 42. The voltage detection unit 41 is configured to detect a voltage of the peripheral power supply 70. When the voltage detection unit 41 detects an abnormal voltage of the peripheral power supply 70, the voltage detection unit 41 sends a signal to the control unit 60. Then the control unit 60 controls the switching unit 30 to work to disconnect the input branch 11 corresponding to the abnormal peripheral power supply 70 with the output branch 21 corresponding to the abnormal peripheral power supply 70. The abnormal voltage of the peripheral power supply 70 refers that the voltage is either too low or too high. The detection unit 42 is configured to detect the currents of the input branch 11 and the output branch 21. When the current detection unit 42 detects an abnormal current of the input branch 11, the detection unit 42 sends an abnormal signal to the control unit 60. Then the control unit 60 controls the switching unit 30 to work to disconnect the input branch 11 of the abnormal current with the output branch 21. When the current detection unit 42 detects an abnormal current of the output branch 21, the detection unit 42 sends an abnormal signal to the control unit 60. Then the control unit 60 controls the switching unit 30 to disconnect the output branch 21 of abnormal current with the input branch 11. The abnormal current refers that the current is too large, too small, or less than zero.

Referring to FIG. 1, in one embodiment of the disclosure, the communication unit 50 is configured to communicate with a peripheral power supply 70 and a peripheral tool (not shown) to obtain information of the peripheral power supply 70 and the peripheral tool. The information of the peripheral power supply 70 may be information that is sent after self-checking of the battery pack. When the communication unit 50 receives the abnormal information of the peripheral power supply 70, the control unit 60 directly controls the input branch 11 corresponding to the peripheral power supply 70 to be disconnected with the output branch 21 to protect the peripheral tool. When the communication unit 50 receives the abnormal information of the peripheral tool, the control unit 60 directly controls the output branch 21 to be disconnected with all the input branches 11 to protect the peripheral power supply 70. The control unit 60 is used for controlling the switching unit 30 to work to control an on-off state between the input branch 11 and the output branch 21. For example, the operation processing device of the control unit 60 is a central processing unit (CPU) or a microprocessing unit (MPU), and the storage device is a random-access memory (RAM) or a read-only memory (ROM).

Figure 2:
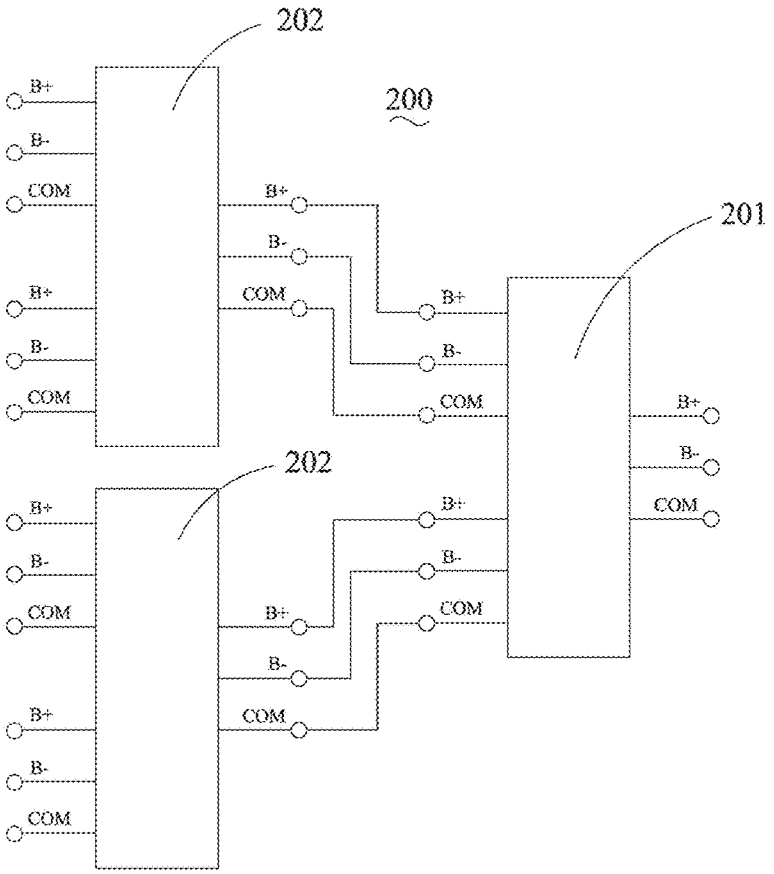
FIG. 2 is a schematic diagram of a cascaded module of the disclosure in the first embodiment.

Referring to FIG. 2, in one embodiment of the disclosure, the cascade module 200 includes a first bus module 201 and a second bus module 202. The first bus module 201 and the second bus module 202 have the same structure as the bus module 100. An output interface of the second bus module 202 is electrically connected to an input interface of the first bus module 201. Users or manufacturers may use a plurality of bus modules 100 to combine and expand as needed to form a cascaded module 200 that conforms to needs. In this embodiment, the number of input branches of both the first bus module 201 and the second bus module 202 is 2, and one first bus module 201 and two second bus module 202 are expanded as a cascade module 200 with four input branches.

Referring to FIG. 2, in an embodiment of the disclosure, when the voltage detection unit of the first bus module 201 detects an abnormal voltage of the output interface of the second bus module 202, the control unit of the first bus module 201 controls the switching unit of the first bus module 201 to work to disconnect the output interface of the second bus module 202 with the input interface of the first bus module 201. The communication unit of the first bus module 201 communicates with the communication unit of the second bus module 202 to obtain information of a peripheral power supply or a battery pack directly or indirectly connected with the second bus module 202. When the communication unit of the first bus module 201 obtain abnormal information, the control unit of the first bus module 201 controls the input branch of the first bus module 201 to be disconnected with the output branch of the second bus module 202.

Figure 3:
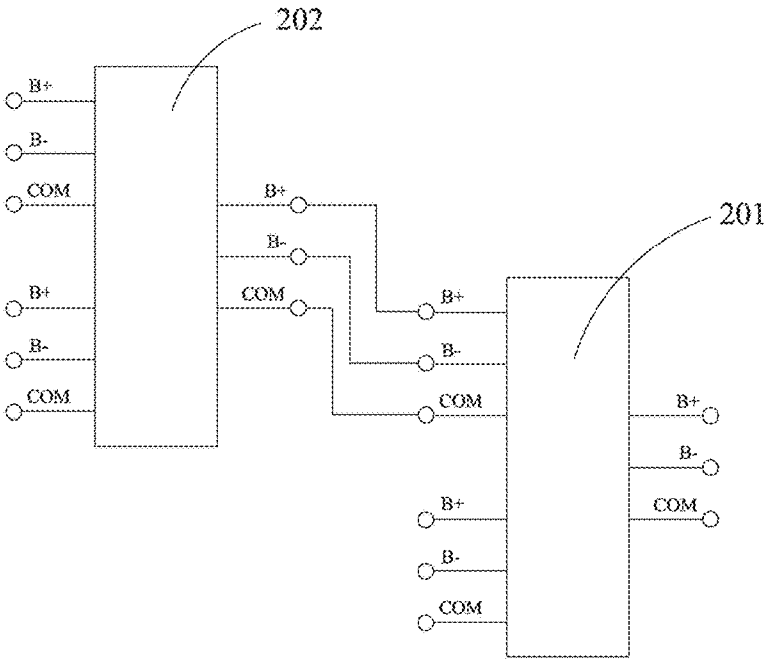
FIG. 3 is another schematic diagram of the cascade module shown in FIG. 2.

Referring to FIG. 2 and FIG. 3, in one embodiment of the disclosure, the number of input branches of the first bus module 201 is the same with the number of input branches of the second bus module 202. In other embodiments of the disclosure, the number of input branches of the first bus module 201 may also be different from the number of input branches of the second bus module 202. Each input branch of the first bus module 201 may be electrically connected to one second bus module 202. Or it can be configured that only a portion of the input branches of the first bus module 201 may be electrically connected to the output branches of the second bus module 202, at this point, the number of input branches of the cascade module 200 is, for example, 3.

Figure 4:
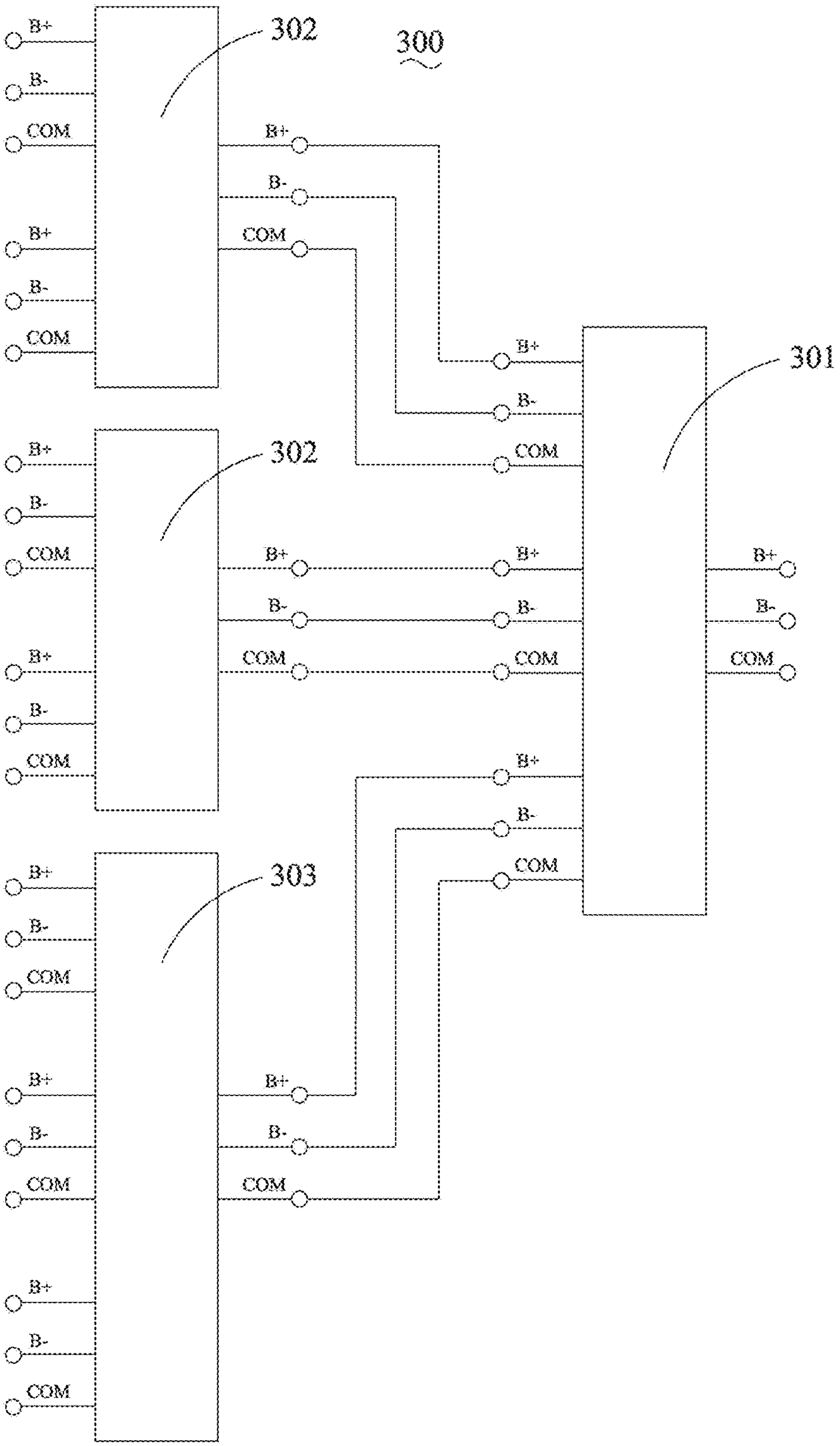
FIG. 4 is a schematic diagram of a cascaded module of the disclosure in the second embodiment.

Referring to FIG. 4, one embodiment of the disclosure further provides another cascade module 300 which includes a first bus module 301, a second bus module 302, and a third bus module 303. The structures of the first bus module 301, the second bus module 302, and the third bus module 303 are substantially the same, except that the number of input branches of the second bus module 302 is different from the number of input branches of the third bus module 303. The output branches of the second bus module 302 and the third bus module 303 are electrically connected to the input branches of the first bus module 301 respectively.

Figure 5:
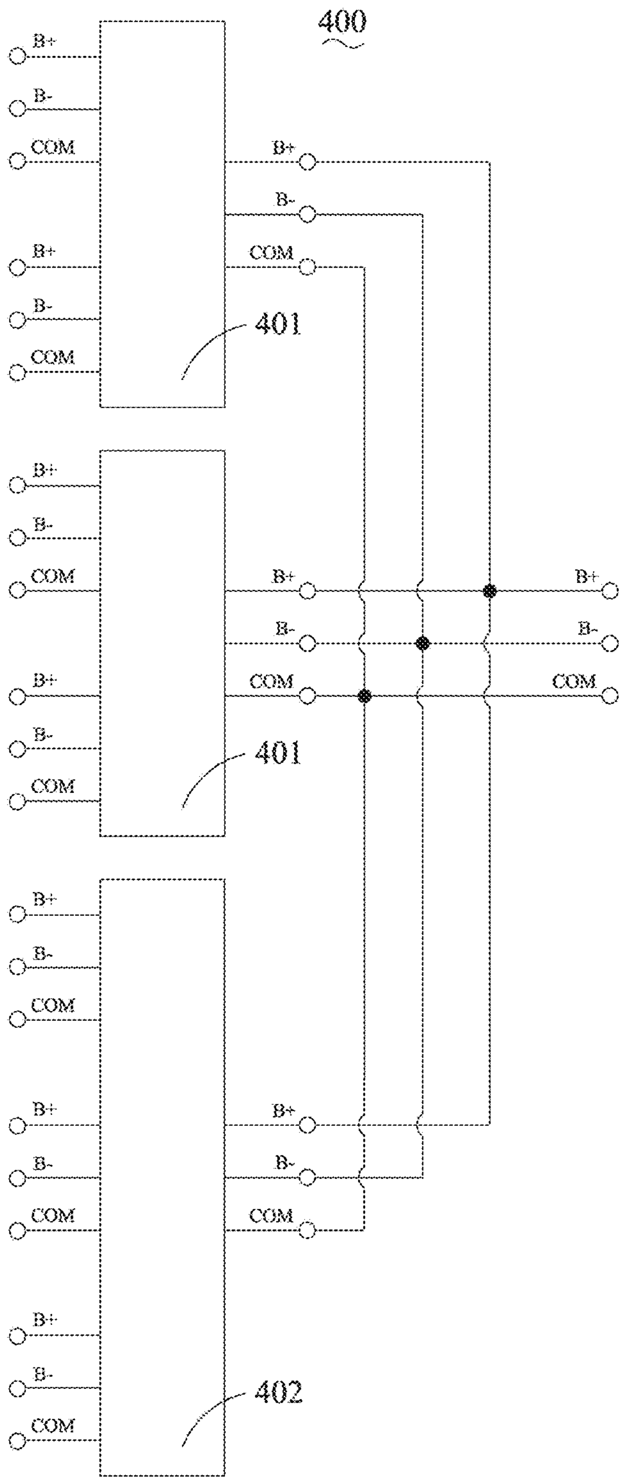
FIG. 5 is a schematic diagram of a cascaded module of the disclosure in the third embodiment.

Referring to FIG. 5, one embodiment of the disclosure further provides a cascade module 400 which includes a first bus module 401 and a second bus module 402. Wherein the output interfaces of the first bus module 401 and the second bus module 402 are electrically connected with each other, and the communication units of the first bus module 401 and the second bus module 402 are electrically connected with each other. The number of input branches of the first bus module 401 and the second bus module 402 may be equal, or may not be equal.

Figure 6:
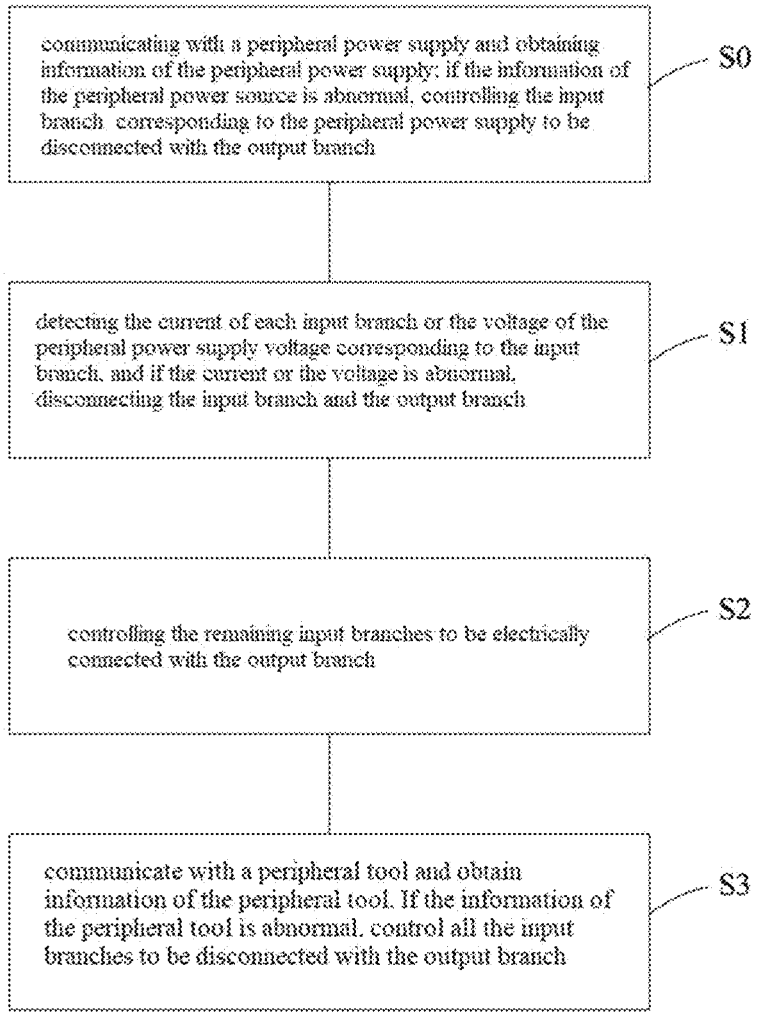
FIG. 6 is a flow chart of a bus module control method of the disclosure.

Referring to FIG. 6, one embodiment of the disclosure further provides a control method of the bus module 100, the method includes:

- S0, communicating with a peripheral power supply and obtaining information of the peripheral power supply; if the information of the peripheral power source is abnormal, controlling the input branch 11 corresponding to the peripheral power supply to be disconnected with the output branch 21;
- S1, detecting the current of each input branch 11 or the voltage of the peripheral power supply voltage corresponding to the input branch 11, and if the current or the voltage is abnormal, disconnecting the input branch 11 and the output branch 21;
- S2, controlling the remaining input branches 11 to be electrically connected with the output branch 21;
- S3, communicating with a peripheral tool and obtaining information of the peripheral tool, if the information of the peripheral tool is abnormal, controlling all the input branches 11 to be disconnected with the output branch 21.

The peripheral power supply may be a battery pack or another bus module plugged with a battery pack. The information anomaly of the peripheral power includes, for example, over-voltage, under-voltage, over-heat, and short circuit. The peripheral tool may be a power tool, such as an electric drill, an electric saw, a dust collector, a mower, or another bus module electrically connected to the power tool.

Figure 7:
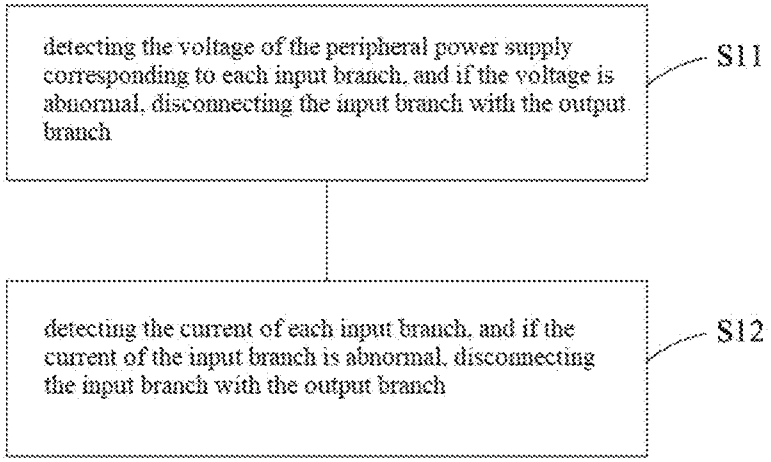
FIG. 7 is a flow chart of S1 in FIG. 6.

Referring to FIG. 7, the S1 further includes:

- S11, detecting the voltage of the peripheral power supply corresponding to each input branch 11, and if the voltage is abnormal, disconnecting the input branch 11 with the output branch 21;
- S12, detecting the current of each input branch 11, and if the current of the input branch 11 is abnormal, disconnecting the input branch 11 with the output branch 21.

Figure 8:
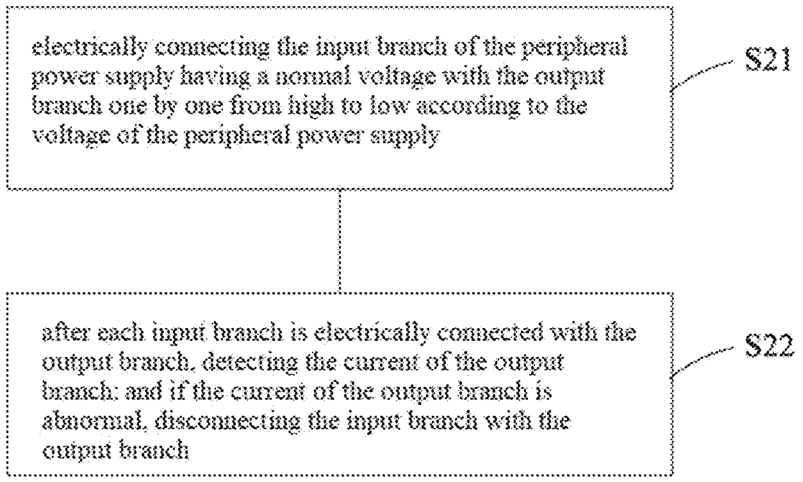
FIG. 8 is a flow chart of S2 in FIG. 6.

Referring to FIG. 8, the S2 further includes:

- S21, electrically connecting the input branch 11 connected with the peripheral power supply having a normal voltage to the output branch 21 from high voltage to low voltage subsequently;
- S22, after each input branch 11 is electrically connected with the output branch 21, detecting the current of the output branch 21; and if the current of the output branch 21 is abnormal, disconnecting the input branch 11 with the output branch 21.

Figure 9:
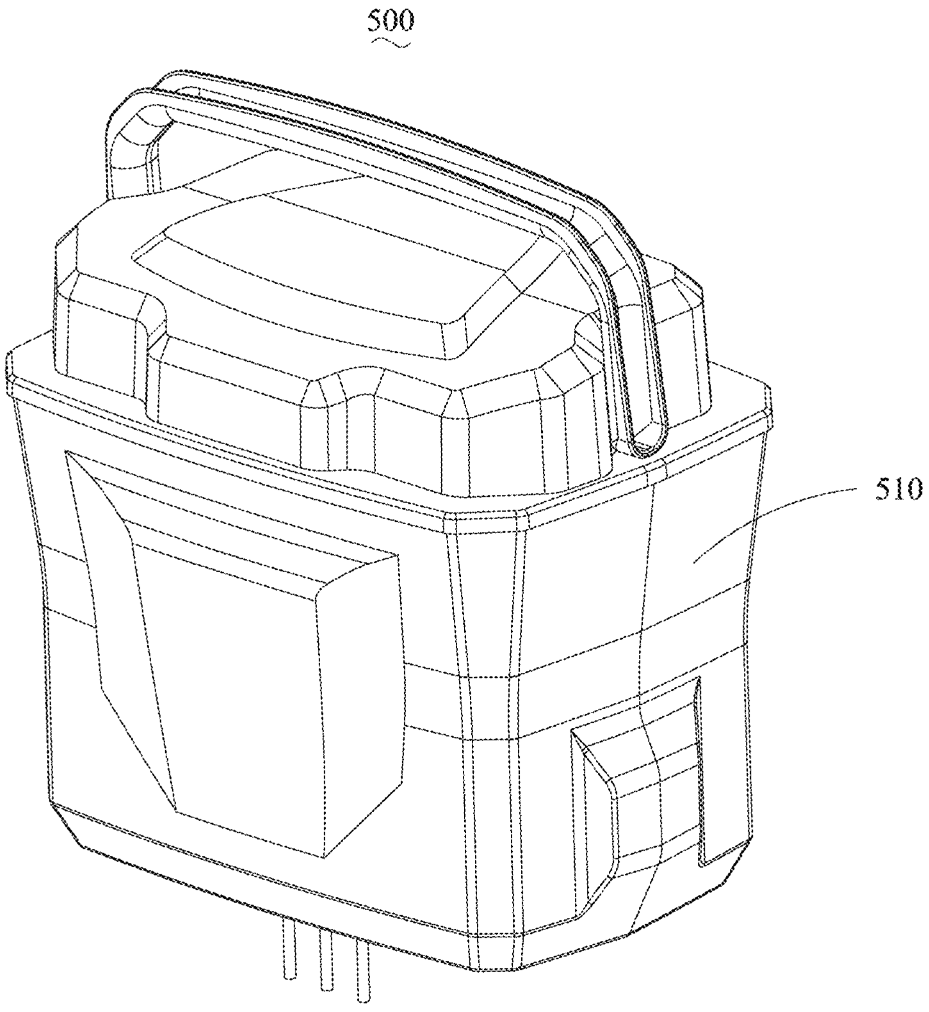
FIG. 9 is a perspective diagram of a battery pack assembly.
Figure 10:
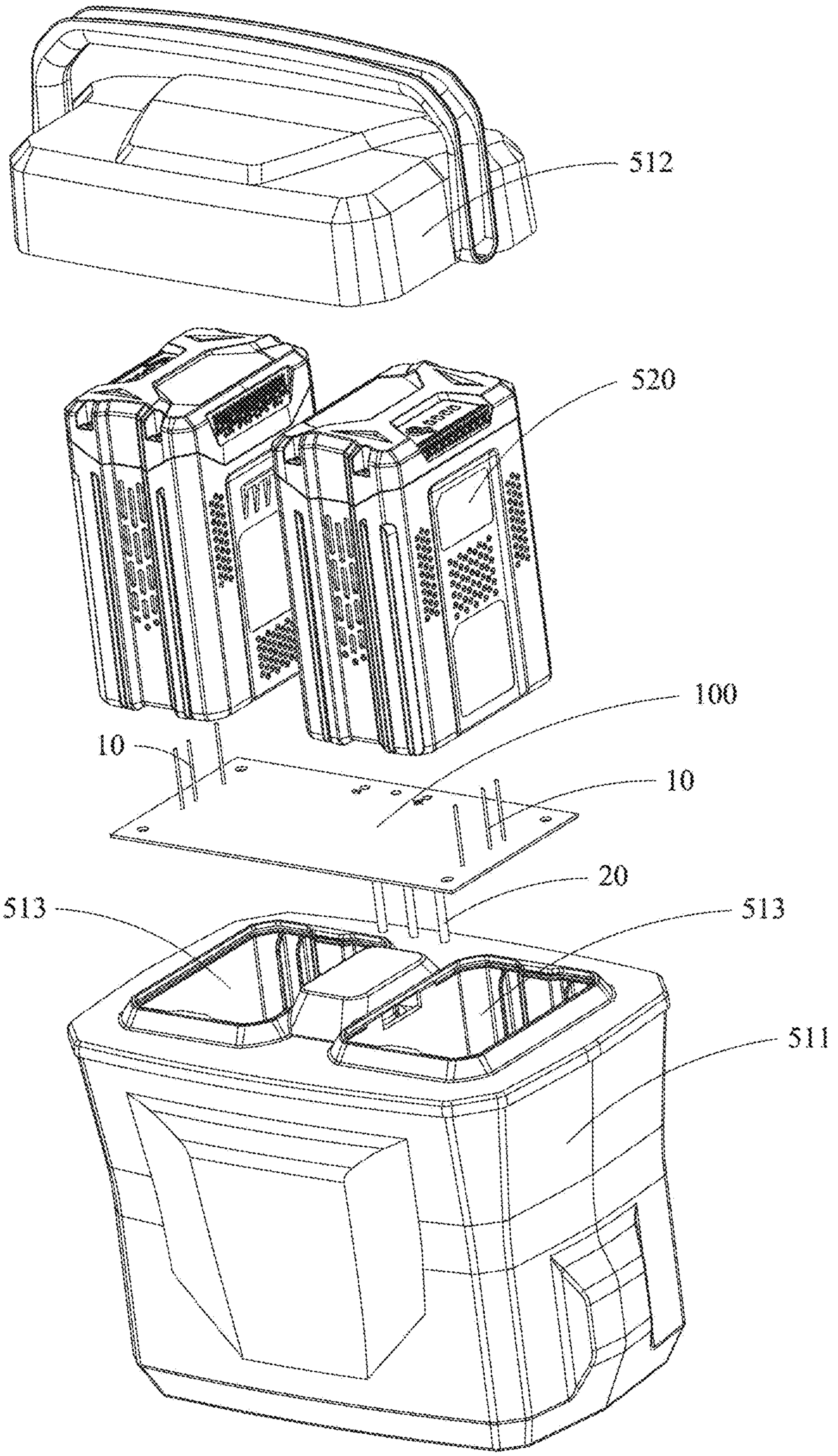
FIG. 10 is a perspective exploded view of the battery pack assembly shown in FIG. 9.

Referring to FIG. 9 and FIG. 10, one embodiment of the disclosure further provides a battery pack assembly 500 which includes a housing 510, a battery pack 520 housed in the housing 510, and the bus module 100. The housing 510 includes a base 511 and a top cover 512 mounted on the base 511. The base 511 and the top cover 512 cooperate to form a containing cavity 513 for containing the battery pack 520. The input unit 10 of the bus module 100 is electrically connected with the battery pack 520 to obtain power of the battery pack 520. The output unit 20 of the bus module 100 is configured to output power of the battery pack 520. The number of the battery packs 520 is, for example, two, and the number of the input units 10 of the bus module 100 is, for example, two. The number of battery packs 520 may also be adjusted according to different needs. The user or manufacturer may select and use the bus module 100 according to the number of battery packs 520 needed.

Figure 11:
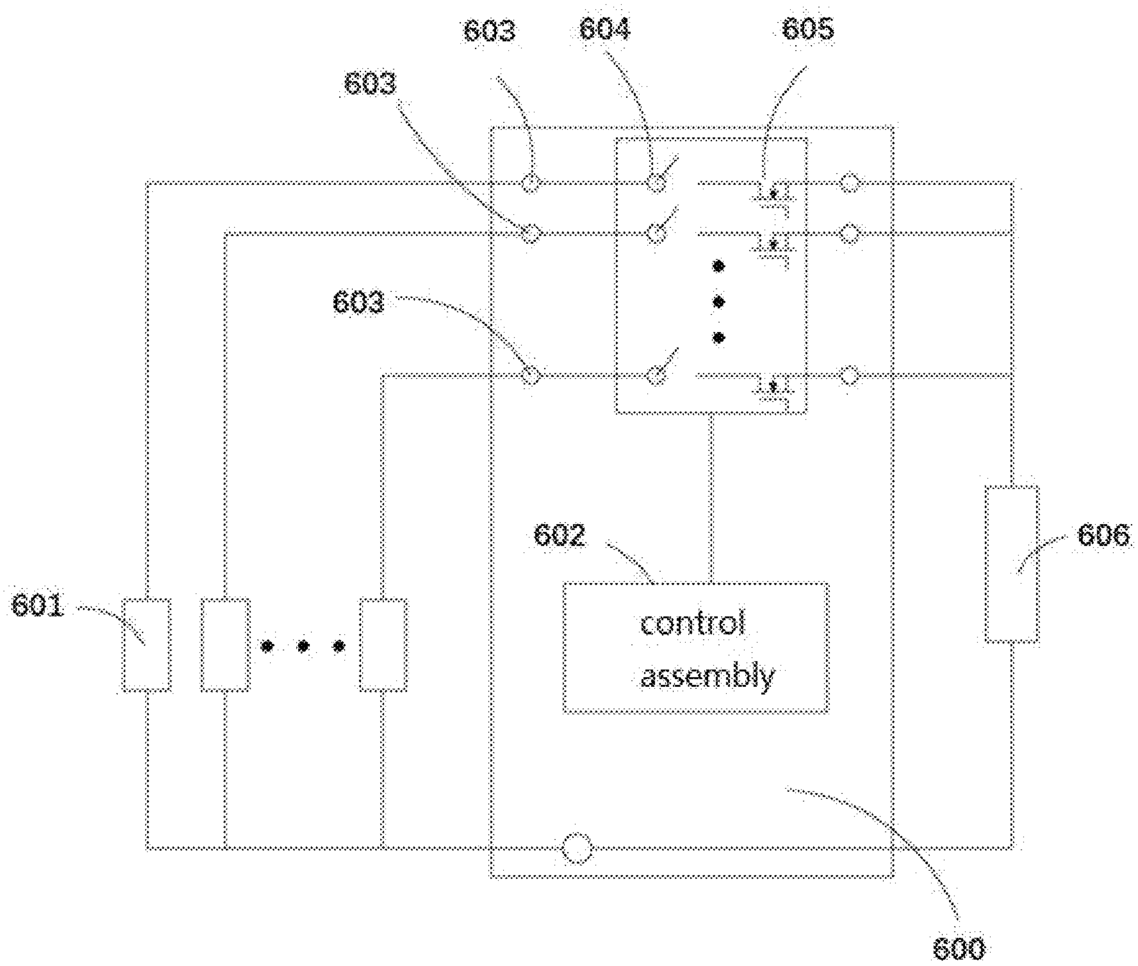
FIG. 11 is a schematic diagram of a module structure of a multi-battery pack management system in one embodiment.

Referring to FIG. 11, one embodiment of the disclosure further provides a multi-battery pack management system 600 of battery pack to control the battery pack 601 with the same specifications to supply power for the load 606. The multi-battery pack management system 600 includes at least two battery interfaces 603 and a control assembly 602. The battery interface 603 is used to connect the battery pack 601 and form a power supply branch with the battery pack 601. Different power supply branches are connected in parallel with each other to form a power supply trunk to supply power for the load 606. The control assembly 602 detects the voltage of the battery pack 601 corresponding to each power supply branch, and confirms the priority level of each power supply branch according to the voltage level. The priority level is used to represent the discharging order of the power supply branch in all power supply branches. The priority level may be represented by a number. For example, a multi-battery pack management system is provided with three power supply branches: A, B, and C. The priority level of the power supply branch A is 2, the priority level of the power supply branch B is 1, and the priority level of the power supply branch C is 3. When the multi-battery pack management system works, the power supply branch B supplies power for the load first. Then the power supply branch A and the power supply branch B are connected in parallel with each other to supply power to the load when the voltage difference between the branch A and branch B is within a preset value. And the power supply branch C, the power supply branch A and the power supply branch B are connected in parallel with each other to supply power to the load when the voltage of branch A, B and C is same or the voltage difference of branch A, B and C is within a preset value. Numbers 1, 2, 3 represent the priority levels of power supply branches A, B, C. The same specifications refers to the battery packs 601 with the same rated voltage. For example, a multi-battery pack management system is provided with power supply branches: A1, B1, C1. The voltages of the battery pack A1, the battery pack B1, and the battery pack C1 are 39V, 40V, 38V respectively. The priority level of the power supply branch A1 is 2, the priority level of the power supply branch B1 is 1, and the priority level of the power supply branch C1 is 3. When the voltages of any two battery packs 601 corresponding to the power supply branches are the same, the priority level of the two power supply branches is set to be the same. The same voltages may refer that two battery packs have the same or approximately the same voltage values, or the voltage difference of the two battery packs is less than a preset value.

Referring to FIG. 11, in one embodiment of the disclosure, the control assembly 602 may be an analog circuit, a digital circuit, a single chip microcomputer, or the like. The control assembly 602 controls the power supply branch with the highest priority level to work. When the voltage difference between the load 606 and the battery pack 601 of the next priority level is less than the first voltage threshold, the control assembly 602 controls the power supply branch corresponding to the next priority level to work and connect in parallel with the current working power supply branch. The multi-battery pack management system 600 can control the battery pack to participate in supplying power in turn according to voltage level of the battery pack, and enable the battery packs participating in supplying power to supply power to the load 606 at the same or substantially the same voltages in parallel. In this embodiment, the criterion may be that the difference between the voltage across the load 606 and the voltage of the battery pack 601 of the power supply branch corresponding to the next priority level is less than the first voltage threshold. The first voltage threshold may be preset by the manufacturer, may be set by the multi-battery pack management system 600 according to the rated voltage of the battery pack 601, or may be set by the user. When the load 606 is relatively large, the current flowing through the load 606 is also relatively large. A larger first voltage threshold should be selected at this time. When the load 606 is small, the current flowing through the load 606 is also relatively small. At this point, the power supply demand is relatively small, and the smaller first voltage threshold may be selected. The first voltage threshold is proportional to the magnitude of the current of the power supply trunk. The proportional relationship may be a linear relationship or a non-linear relationship. When the control assembly 602 detects that the voltage of the battery pack 601 is greater than the overvoltage value or less than the under-voltage value, the control assembly 602 directly controls the power supply branch corresponding to the battery pack 601 to stop working. Such that not only power supplied by the abnormal battery pack 601 can be avoided, but also the over-discharge of the battery pack 601 to reduce the service life of the battery pack 601 can be avoided. The overvoltage value, the under-voltage value may be preset by the manufacturer, and may also be set by the multi-battery pack management system 600 according to the rated voltage of the battery pack 601, or may be set by the user. When the difference between the voltage across the load 606 and the under-voltage is less than a third voltage threshold, the control assembly 602 controls all the power supply branches to stop working. In this embodiment, the criterion is that the voltage difference between the voltage across the load 606 and the under-voltage is less than the third voltage threshold.

Referring to FIG. 11, in one embodiment of the disclosure, the control assembly 602 obtains internal information of the battery pack 601 through the battery interface 603, and confirms whether the battery pack 601 is abnormal according to the internal information. If the battery pack 601 is abnormal, the control assembly 602 controls the power supply branch corresponding to the battery pack 601 to stop working. The alarm information is sent to inform the user of the abnormal battery pack 601. The anomaly may be that a missing single battery in the battery pack, the single battery voltage is too high, the single battery voltage is too low, the temperature of the single battery is too high, and the like. When the fault of the abnormal battery pack 601 is excluded, the control assembly 602 re-determines the priority level corresponding to each power supply branch. When the difference between the voltage of the battery pack 601 and the voltage across the load 606 is greater than the second voltage threshold after the fault removal, the control assembly 602 controls all current working power supply branches to stop working. In this embodiment, the criterion is that the difference between the voltage of the battery pack 601 and the voltage across the load 606 is greater than the second voltage threshold. The second voltage threshold may be preset by the manufacturer, may also be set by the multi-battery pack management system 600 according to the rated voltage of the battery pack 601, or may be set by the user.

Referring to FIG. 11, in an embodiment of the disclosure, the control assembly 602 detects a current of the power supply branch. The power supply branch is provided with a current detection element to detect the current of the power supply branch, and to send the detected current value to the control assembly 602. When the change amount of the current of the power supply branch in the unit time is greater than a preset value, the control assembly controls the power supply branch to stop working to protect the power supply branch. When the current of the power supply branch is greater than the first current threshold, the control assembly 602 controls the power supply branch to reduce the current output. Such that the great heating amount and high temperature of the battery pack 601 caused by the excessive current of the power supply branch to reduce the service life of the battery pack 601 can be avoided. When the current of the power supply branch is less than the second current threshold, the control assembly 602 controls the power supply branch to stop working.

Referring to FIG. 11, in one embodiment of the disclosure, a power supply branch with a current greater than the second current threshold is defined as a first type of power supply branch, and a power supply branch with a current smaller than the second current threshold is defined as a second type of power supply branch. When the number of the second type of power supply branches exceeds a preset number threshold, the control assembly 602 controls all the first type of power supply branches to stop working and controls all the second type of power supply branches to work. When the voltage of the battery pack 601 corresponding to the second type of power supply branch is not greater than the under-voltage value, the control assembly 602 controls the second type of power supply branch to stop working and controls the first type of power supply branch to work. The electric quantity of the virtual high battery pack is centralizedly used up to facilitate centralized charging of the virtual high battery pack. The preset number threshold may be set as needed. The control assembly 602 calculates the current of the power supply trunk according to the current of the current working power supply branch. When the current of the power supply trunk is greater than the third current threshold, the control assembly 602 judges that a short circuit occurs, and controls all current working power supply branches to stop working. When a time of the current of the power supply trunk exceeding the third current threshold exceeds the preset third current time threshold, the control assembly 602 judges that a short circuit occurs, and controls all current working power supply branches to stop working. The current of the power supply trunk is calculated by the currents of all power supply branches. In other embodiments of the disclosure, the power supply trunk may also be provided with a current detection element to directly measure the current of the power supply trunk.

Referring to FIG. 11, in one embodiment of the disclosure, the power supply branch is further provided with a switching tube 605. When current of the power supply branch exceeds the first current threshold, the control assembly 602 reduces the current output of the power supply branch by controlling the duty cycle of the control signal of the switching tube 605. By controlling the on-off time ratio of the switching tube 605 within a unit time to reduce the current output. The control assembly 602 cuts off the power supply branch by controlling the control signal of the switching tube 605 when the power supply branch is required to stop working. The switching tube 605 may be a metal oxide semiconductor field effect transistor, an insulated gate bipolar transistor, or the like. To enhance the safety factor, the power supply branch is also provided with an electromagnetic relay 604. The control assembly 602 directly controls the electromagnetic relay 604 to open to cut off the power supply branch when the power supply branch is required to stop working. The load 606 may also provide a control circuit board (not shown) to communicate with the control assembly 602. The control circuit board is configured to detect the state of the load 606 and determine whether the load 606 is abnormal or at fault. When the load 606 generates an anomaly or a fault, the control circuit board sends fault information to the control assembly 602 to enable the control assembly 602 to control all current working power supply branches to stop working to avoid safety accidents.

Figure 12:
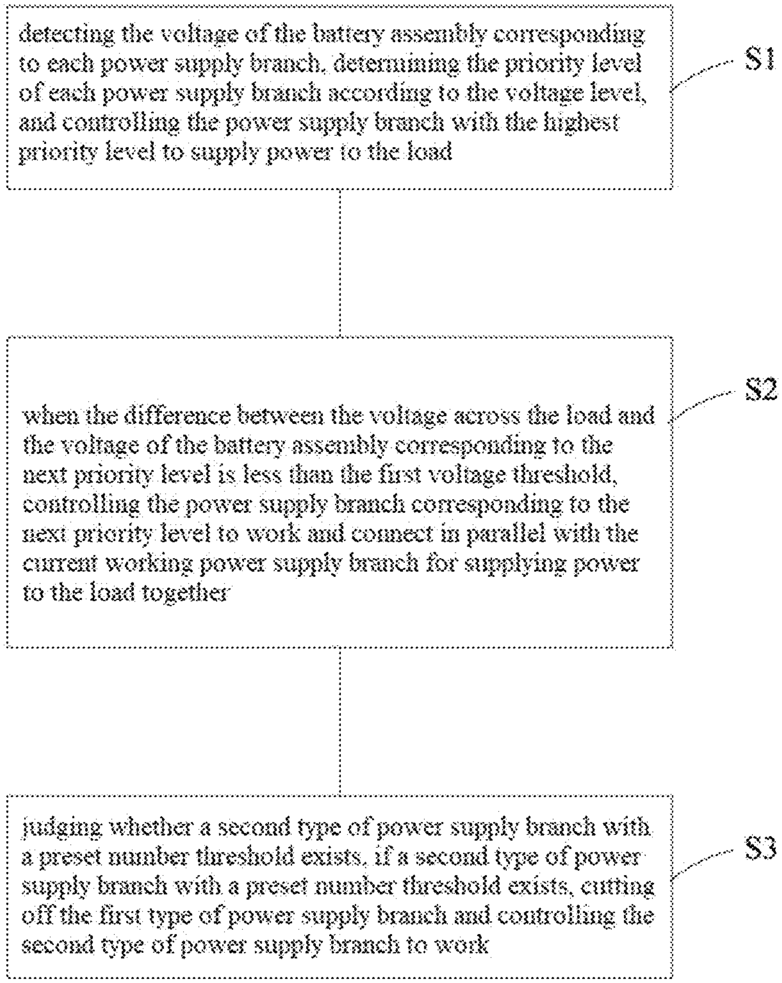
FIG. 12 is a flow chart of a multi-battery pack parallel control method in one embodiment.

Referring to FIG. 12, one embodiment of the disclosure further provides a multi-battery pack parallel control method for controlling the plurality of battery packs 601 to work in parallel to power the load 606. The multi-battery pack parallel control method includes:

S1, detecting the voltage of the battery pack corresponding to each power supply branch, determining the priority level of each power supply branch according to the voltage level, and controlling the power supply branch with the highest priority level to supply power to the load, when the voltages of the battery packs corresponding to any two power supply branches are the same, setting the priority levels of the two power supply branches to be the same; the same voltage may refer that the voltage values of the two battery packs are totally or approximately the same, or the voltage difference of the two battery packs is less than a preset value;

S2, when the difference between the voltage across the load and the voltage of the battery pack corresponding to the next priority level is less than the first voltage threshold, controlling the power supply branch corresponding to the next priority level to work and connect in parallel with the current working power supply branch for supplying power to the load together;

S3, judging whether a second type of power supply branch with a preset number threshold exists, if a second type of power supply branch with a preset number threshold exists, cutting off the first type of power supply branch and controlling the second type of power supply branch to work, the first type of power supply branch refers to the power supply branch having a current greater than the second current threshold, and the second type of power supply branch refers to the power supply branch having a current less than the second current threshold.

Figure 13:
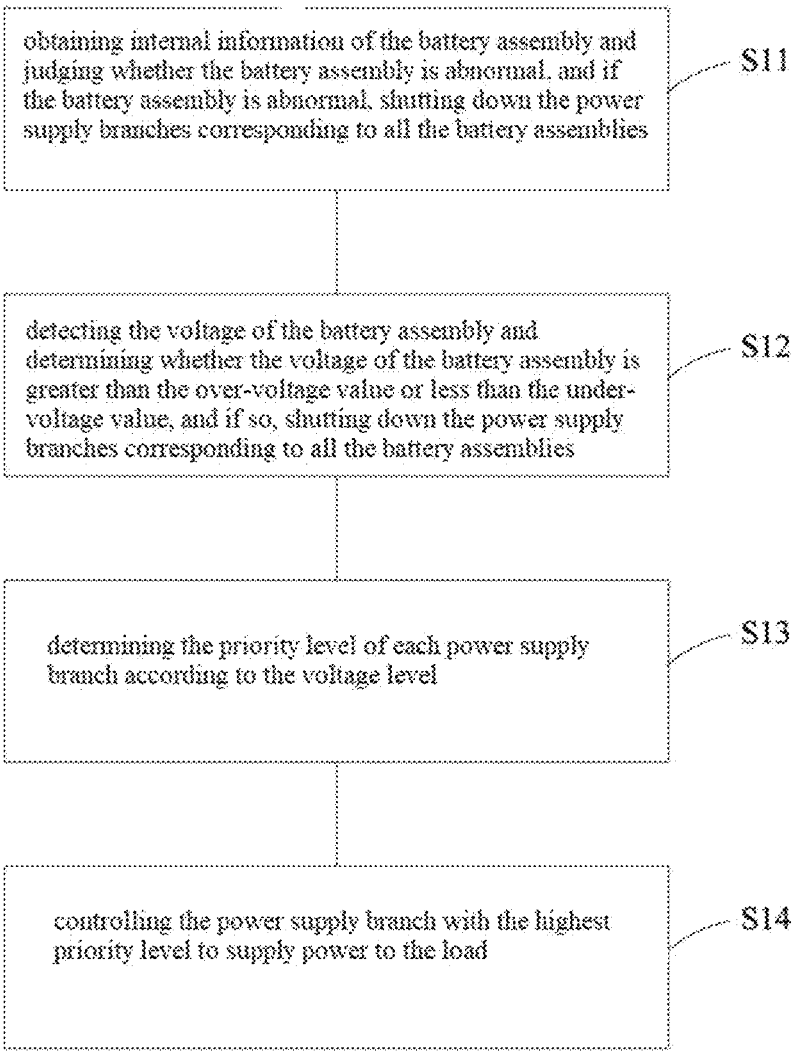
FIG. 13 is a flow chart of S1 in FIG. 12.

Referring to FIG. 13, in one embodiment of the disclosure, the S1 further includes:

S11, obtaining internal information of the battery pack and judging whether the battery pack is abnormal, and if the battery pack is abnormal, shutting down the power supply branches corresponding to all the battery packs;

S12, detecting the voltage of the battery pack and determining whether the voltage of the battery pack is greater than the over-voltage value or less than the under-voltage value, and if so, shutting down the power supply branches corresponding to all the battery packs;

S13, determining the priority level of each power supply branch according to the voltage level;

S14, controlling the power supply branch with the highest priority level to supply power to the load.

Figure 14:
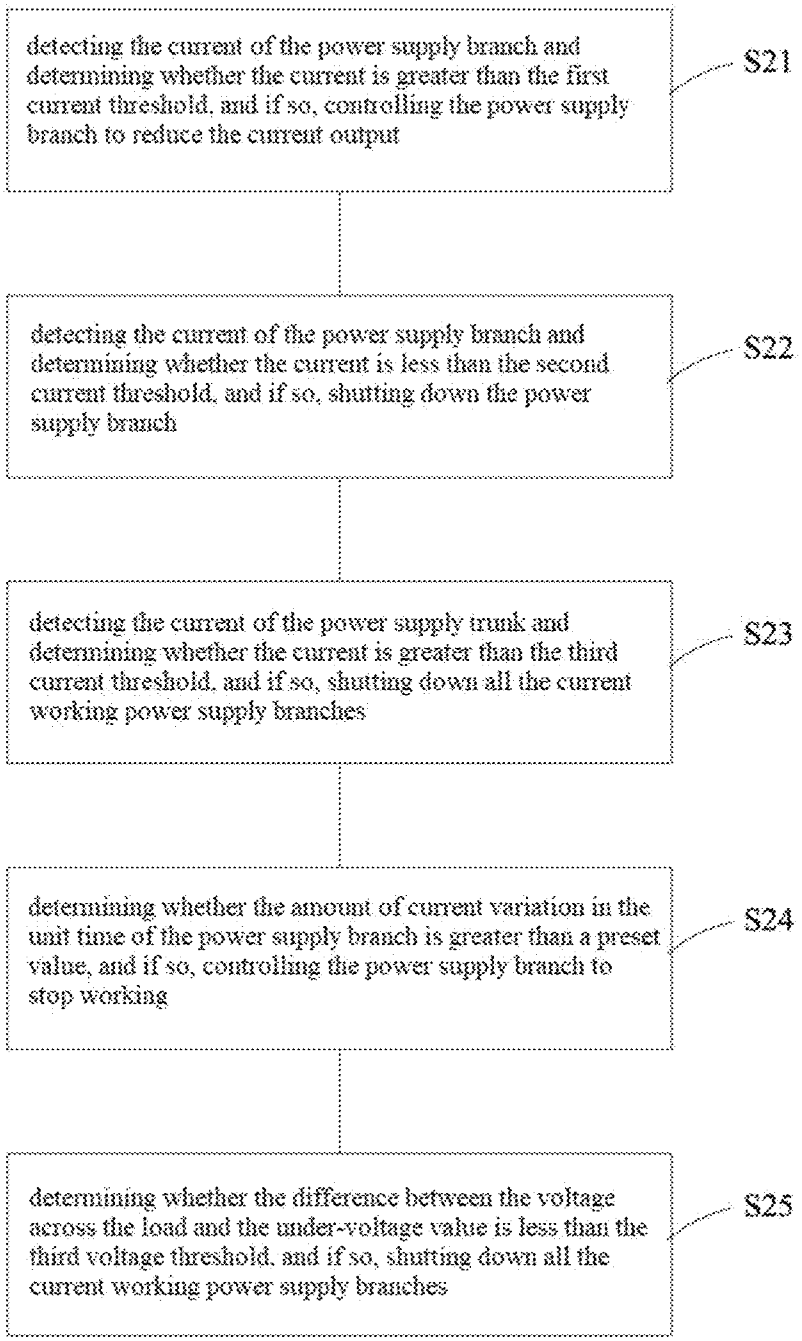
FIG. 14 is a flow chart of S2 in FIG. 12.

As shown in FIG. 14, the S2 further includes:

S21, detecting the current of the power supply branch and determining whether the current is greater than the first current threshold, and if so, controlling the power supply branch to reduce the current output;

S22, detecting the current of the power supply branch and determining whether the current is less than the second current threshold, and if so, shutting down the power supply branch;

S23, detecting the current of the power supply trunk and determining whether the current is greater than the third current threshold, and if so, shutting down all the current working power supply branches, determining whether a time of the current of the power supply trunk greater than the third current threshold exceeds a preset third current time threshold, and if so, shutting down all the current working power supply branches;

S24, determining whether the amount of current variation in the unit time of the power supply branch is greater than a preset value, and if so, controlling the power supply branch to stop working, the amount of current variation per unit time may refer to an increment in unit time, or may refer to a decrement in unit time;

S25, determining whether the difference between the voltage across the load and the under-voltage value is less than the third voltage threshold, and if so, shutting down all the current working power supply branches.

Figure 15:
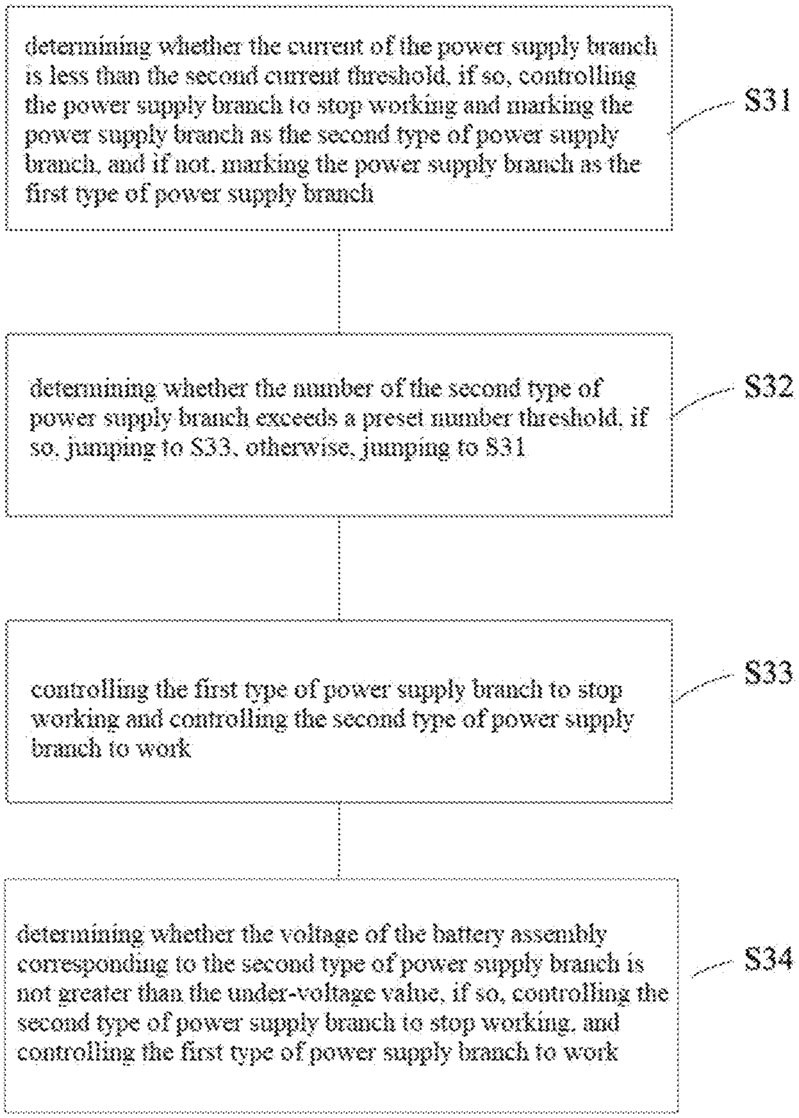
FIG. 15 is a flow chart of S3 in FIG. 12.

Referring to FIG. 15, in one embodiment of the disclosure, the S3 further includes:

S31, determining whether the current of the power supply branch is less than the second current threshold, if so, controlling the power supply branch to stop working and marking the power supply branch as the second type of power supply branch, and if not, marking the power supply branch as the first type of power supply branch, when a time of the current of the power supply branch less than second current threshold exceeds the second current time threshold, controlling the power supply branch to stop working, and marking the power supply branch as the second type of power supply branch;

S32, determining whether the number of the second type of power supply branch exceeds a preset number threshold, if so, jumping to S33, otherwise, jumping to S31;

S33, controlling the first type of power supply branch to stop working and controlling the second type of power supply branch to work;

S34, determining whether the voltage of the battery pack corresponding to the second type of power supply branch is not greater than the under-voltage value, if so, controlling the second type of power supply branch to stop working, and controlling the first type of power supply branch to work.

The disclosure further provides a power tool which includes an operation mechanism, a power supply system, and the multi-battery pack management system 600. The operation mechanism is used for achieving the functions of the power tool, such as cutting, dust collecting, air blowing, and the like. The power supply system includes a plurality of battery packs of the same or substantially same specifications, and the battery pack supplies power for the operation mechanism.

In summary, the disclosure provides a bus module, a cascade module and a bus module control method to facilitate users or manufacturers to quickly connect several battery packs in parallel with each other to supply power for the power tool, thereby the output power of the power tool is increased. The battery packs are controlled to participate in power supply in sequence according to the voltage of the battery pack from high to low, and the battery packs of the same voltage are connected in parallel to supply power. Such that the problem of discharging the low-voltage battery pack by the high-voltage battery pack is effectively solved, and the service life of the battery pack is prolonged.

The above description is merely preferred embodiments and description of the principles of the disclosure. For those skilled in the art, the scope of the disclosure is not limited to the particular combination of the above-described technical features, but also to other technical solutions formed by any combination of the above-described technical features or the equivalent features thereof without departing from the inventive concept, such as, technical solutions that formed by using the above-described features and technical features of similar function to replace with each other, but not limited herein.

In addition to the technical features described in the specification, the remaining technical features are prior art for the skilled in the field. To highlight the creative characteristics of the disclosure, the remaining technical features will not described in detail herein.

What is claimed is:

1. A battery pack management system, comprising:

a plurality of battery packs for supplying a power to a load;

a plurality of battery interfaces, each of the battery packs electrically connected in parallel by the battery interfaces;

a plurality of switching units, the switching units electrically connected to the battery interfaces, the battery packs through the battery interfaces electrically connected to the switching units;

a control assembly, the control assembly detecting a voltage level of each of the battery packs and determining the battery packs having a first highest priority level through the voltage level detected for controlling the switching units being closed to output the highest priority level; and a plurality of communication units, the communication unit electrically connected to the battery packs and the load for collecting information of the battery packs and the load, the switching units closed by the control assembly through the information for supplying the power to the load by the battery packs having the highest priority level.

2. The battery pack management system of claim 1, wherein the switching units comprise a plurality of electromagnetic relays and switch tubes.

3. The battery pack management system of claim 1, wherein the control assembly determines the battery packs having a second highest priority level through the voltage level detected, and determines a first voltage difference between the first highest priority level and the second highest priority level being within a preset value for controlling the switching units being closed to supply the power to the load by the battery packs in parallel.

4. The battery pack management system of claim 1, wherein the control assembly determines the battery packs having a second highest priority level through the voltage level detected, and determines the first highest priority level and the second highest priority level being substantially a same level for controlling the switching units being closed to supply the power to the load by the battery packs in parallel.

5. The battery pack management system of claim 1, wherein the control assembly determines an under voltage value of the load and determines a second voltage difference between the load and the battery packs being less than the under voltage value for controlling the switching units being opened.

6. The battery pack management system of claim 1, wherein the control assembly determines an over voltage value of the load and determines a third voltage difference between the load and the battery packs being greater than the over voltage value for controlling the switching units being opened.

7. The battery pack management system of claim 1, wherein the control assembly receives the information collected for controlling the switching units being disconnected when the information being abnormal.

8. The battery pack management system of claim 1, wherein the control assembly determines a current difference of the battery packs and determines the current difference being less than a preset value for controlling the switch units being opened.

9. The battery pack management system of claim 8, wherein the control assembly determines the current difference of battery packs and determines the current difference being greater than a first current threshold for reducing a current output of the battery packs by controlling a duty cycle of the switch units.

10. The battery pack management system of claim 1, wherein the control assembly determines a current difference of battery packs and determines the current difference being substantially zero for controlling the switch units being opened.

11. The battery pack management system of claim 1, wherein the control assembly determines a current value of the load and determines the current value being greater than a preset value for controlling the switching units being opened.

12. A method of battery pack management system for controlling a plurality of battery packs supplying a power to a load in parallel, comprising:

determining a first highest priority level and a second highest priority level of the battery packs through the control assembly;

collecting information of the battery packs and the load by a communication unit; and switching a plurality of switching units closed by the control assembly through the information, wherein, determining a first voltage difference between the first highest priority level and the second highest priority level is a preset value or substantially a same level through the control assembly for controlling the switching units being closed to supply the power to the load by the battery packs in parallel, and wherein, determining a current difference of the battery packs is greater than a first current threshold through the control assembly for reducing a current output of the battery packs by controlling a duty cycle of the switch units.

13. The method of battery pack management system of claim 12, further comprising determining a second voltage difference between the load and the battery packs being less than an under voltage value for controlling the switching units being opened through the control assembly.

14. The method of battery pack management system of claim 12, further comprising determining a third voltage difference between the load and the battery packs being greater than an over voltage value for controlling the switching units being opened through the control assembly.

15. The method of battery pack management system of claim 12, further comprising receiving the information collected for controlling the switching units being disconnected through the control assembly when the information being abnormal.

16. A battery pack management system, comprising:

at least one input interface, the input interface comprising at least one input branch, at least one peripheral power electrically connected to the input interface through the input branch;

at least one output interface, the output interface comprising at least one output branch, at least one peripheral tool electrically connected to the output interface through the output branch;

at least one switching unit, the switching unit electrically connected to the input interface and the output interface, the input branch and the output branch being electrically connected to the switching unit in series;

at least one control unit, the control unit electrically connected to the switching unit for controlling the switching unit being closed; and at least one communication unit, the communication unit electrically connected to the input interface and output interface in series for collecting information of the peripheral power and the peripheral tool, the switching unit closed by the control unit through the information for supplying power to the peripheral tool by the peripheral power.

17. The battery pack management system of claim 16, further comprising a detecting assembly electrically connected to the input interface and output interface, the detecting assembly comprising a voltage detecting unit and a current detecting unit.

18. The battery pack management system of claim 17, wherein the voltage detecting unit detects an abnormal voltage of the peripheral power and delivers a signal to the control unit for controlling the switching unit being opened.

19. The battery pack management system of claim 17, wherein the current detecting unit detects an abnormal current of the input branch and delivers a signal to the control unit for controlling the switching unit being opened.

20. The battery pack management system of claim 17, wherein the input interface and output interface each comprising at least one communication terminal to electrically connected to the communication unit.

21. A battery pack management system, comprising:

a plurality of input interfaces, each of the input interfaces comprising an input branch and an input communication terminal, plurality of peripheral powers electrically connected to the input interfaces through the input branch;

a plurality of output interfaces, each of the output interfaces comprising an output branch and an output communication terminal, a plurality of peripheral tools electrically connected to the output interfaces through the output branch;

a plurality of switching units, the switching units electrically connected to the input interfaces and the output interfaces, each of the switching unit electrically connected to the input branch and output branch in parallel;

a control unit, the control unit electrically connected to the switching units for controlling the input branch being connected or disconnected to the output branch by the switching unit; and a communication unit, the communication unit electrically connected to the input interfaces and output interfaces in parallel by the input communication terminal and the output communication terminal for collecting information from the peripheral powers and the peripheral tools, the control unit through the information controlling the peripheral power to supply power to the peripheral tool.

22. The battery pack management system of claim 21, further comprising a detecting assembly electrically connected to the input interfaces and output interfaces, the detecting assembly comprising a voltage detecting unit and a current detecting unit.

23. The battery pack management system of claim 22, wherein the voltage detecting unit detects an abnormal voltage of the peripheral powers and delivers a signal to the control unit for controlling the switching unit being opened.

24. The battery pack management system of claim 22, wherein the current detecting unit detects an abnormal current of the input branch and delivers a signal to the control unit for controlling the switching unit being opened.

25. A power tool system, comprising:

a plurality of bus modules; and a plurality of battery packs electrically connected to the bus modules in parallel for supplying a power to a plurality of loads, wherein, each of the bus module comprises:

an input interface, the input interface comprising an input branch, the battery packs electrically connected to the input interface through the input branch;

an output interface, the output interface comprising an output branch, the loads electrically connected to the output interface through the output branch;

a switching unit, the switching unit electrically connected to the input interface and the output interface, the input branch and the output branch being electrically connected to the switching unit;

a control unit, the control unit electrically connected to the switching unit for controlling the switching unit being closed; and a communication unit, the communication unit electrically connected to the input interface and output interface for collecting information of the battery packs and the loads, the switching unit closed by the control unit through the information, wherein, the control unit determining a first voltage difference between a first highest priority level and a second highest priority level of the battery pack being a preset value or substantially a same level for controlling the switching unit being closed to supply the power to the loads by the battery packs in parallel, and wherein, the control unit determining a current difference of the battery packs is greater than a first current threshold for reducing a current output of the battery packs by controlling a duty cycle of the switch unit.

* * * * *